April 20, 1926.

E. PFLAUM

ANIMAL SCRATCHING DEVICE

Filed Sept. 3, 1925

Inventor
Emil Pflaum
By Philip A. H. Sewell
Attorney

Patented Apr. 20, 1926.

1,581,544

UNITED STATES PATENT OFFICE.

EMIL PFLAUM, OF OMAHA, NEBRASKA.

ANIMAL-SCRATCHING DEVICE.

Application filed September 3, 1925. Serial No. 54,199.

*To all whom it may concern:*

Be it known that I, EMIL PFLAUM, a citizen of the United States, residing at Omaha, in the county of Douglas and State of Nebraska, have invented certain new and useful Improvements in Animal-Scratching Devices, of which the following is a specification, reference being had therein to the accompanying drawings.

The invention relates to back scratching devices for animals, and has for its object to provide a device of this character under which hogs and other animals may pass for scratching their backs, and to provide a device of this character which will accommodate itself to various heights of animals.

A further object is to provide a back scratching device for animals, comprising spaced vertically disposed supports, to the inner sides of which are secured the vertically disposed arms of a U-shaped frame formed from channel iron, and in which arms are slidably mounted the ends of an arcuate brush carrying member, under which animals may pass. Also to provide a guide bar connected to the upper side of the brush carrying members and slidably mounted in the channels arms of the frame and springs connected to the bar and having their ends slidably mounted in the transverse portion of the channel U-shaped member for normally exerting a downward pressure on the guide bar and the brush carrying member. The spring forms means for allowing the device to accommodate itself to different heights of animals passing through the same.

A further object is to slidably mount the ends of the brush carrying member in the channeled arms and through which brush carrying members ends and vertically disposed slots in the channeled arms and supports bolts extend for slidably connecting said ends of the brush carrying member to the supports.

A further object is to provide an oil tank supported on the upper end of the device and provided with a discharge pipe extending downwardly and terminating in a valve casing having oppositely disposed seats whereby during the raising and lowering of the brush carrying member oil will be intermittently discharged into the valve casing and discharged therefrom into a recess in the upper side of the brush carrying member from which recess the oil overflows into channels having perforations in the bottom thereof through which the oil passes to the brushes.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
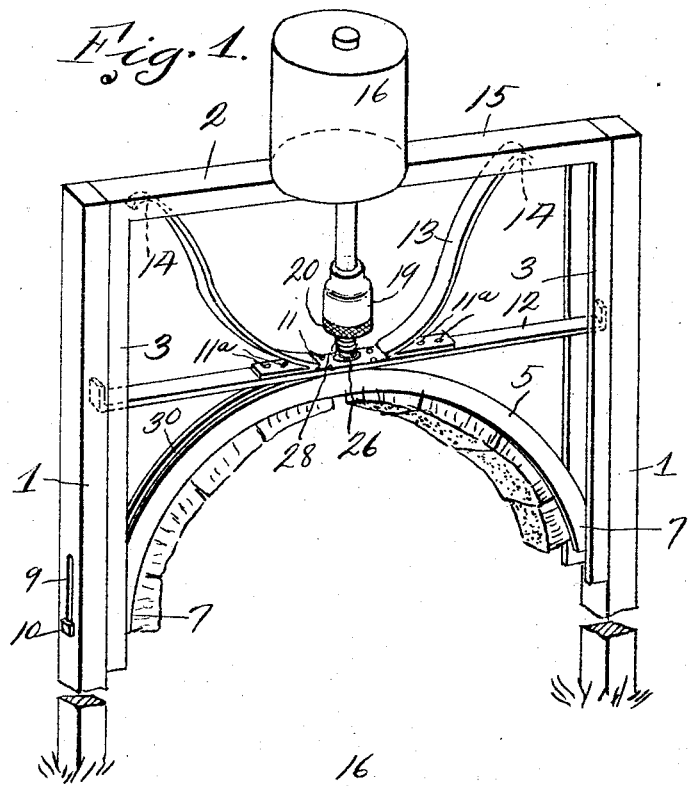
Figure 1 is a perspective view of the animal scratching device.
Figure 4:
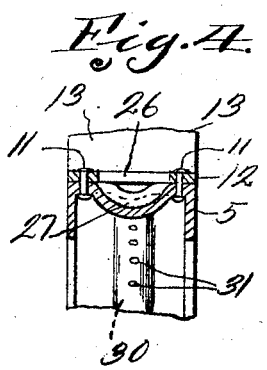
Figure 4 is a vertical transverse sectional view through the upper side of the brush carrying member and the adjacent parts.
Figure 2:
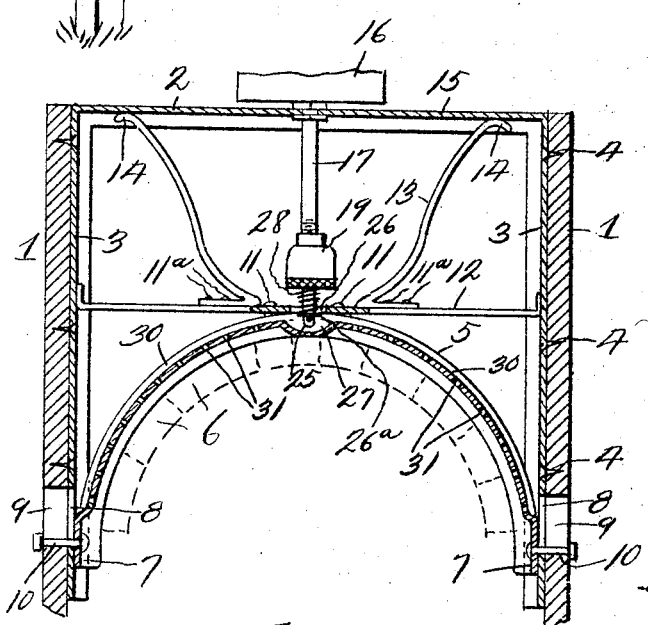
Figure 2 is a vertical longitudinal sectional view through the device.
Figure 3:
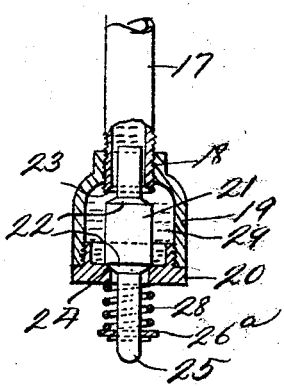
Figure 3 is a vertical transverse sectional view through the double acting valve mechanism.

Referring to the drawing, the numeral 1 designates spaced vertically disposed posts in parallel relation, and which posts are connected together by an inverted U-shaped frame 2, which is formed from channel iron and has its channeled arms 3 downwardly disposed and secured to the inner side of the supports 1, preferably by means of screws 4. Disposed within the frame between the arms 3 thereof is an inverted semicircular channeled member 5, in which brushes 6 may be secured in any suitable manner, and under which brushes an animal passes during a back scratching operation. By forming the brush carrying member 5 from channel iron, it is obvious the sides thereof will prevent lateral displacement of the brushes 6, and which brushes may be held in the member 5 in any suitable manner, or may be entirely eliminated if desired and the opposite flanges of the arcuate member 5 utilized for scratching purposes. The lower ends 7 of the channel member 5 are slidably mounted in the channeled arms 3 of the U-shaped frame 2, and extending through the ends 7 and the vertically disposed slot 8 of the arms 3 and 9 of the supports are bolts 10, which bolts are slidably mounted in said slots 8 and 9 and guide the member 5 during its upward and downward movement. Connected by means of rivets 11 to the upper side of the semicircular shaped member 5 is a horizontally disposed guide bar 12, the ends of which are slidably mounted in the arms 3 of the channeled U-shaped frame 2, therefore it will be seen that when an animal applies pressure to the brushes 6 or the member 5 on either side of the device, the brush holding member 5 will be positively braced and held against side tilting which would bind the same. Also secured to the member 5 by means of the rivets 11ª are spring members 13, which extend upwardly and outwardly and terminate in curved portions 14, disposed in the horizontal portion 15 of the channeled frame 2, and which curved portions are guided in said channeled portion 15 of the frame during upward and downward movement of the brush carrying frame 5 as an animal passes under the same, therefore it will be seen that the device will accommodate itself to animals of various kinds and heights, and the springs 13 will normally maintain the brush carrying member 5 in lowered position.

Mounted on the transverse disposed portion 15 of the U-shaped frame 2 is an oil supply tank 16, which supply tank is provided with a downwardly extending discharge pipe 17 which extends through the portion 15 of the U-shaped frame 2 and terminates between the lower portions of the springs 13. Threaded at 18 on the lower end of the discharge pipe 17 is a valve casing 19, which valve casing is provided with a removable cap 20. Disposed within the valve casing 19 is a valve 21 having its ends provided with valves 22 which cooperate with valve seats 23 and 24 carried by the lower end of the discharge pipe 17 and the removable cap 20. Valve 21 is provided with a downwardly extending valve stem 25 which extends through an aperture 26 in the guide bar 12 and into a depression 27 in the upper side of the arcuate member 5. Interposed between the cap 20 and a washer 26ª carried by the valve stem 25 is a coiled spring 28, which coiled spring normally maintains the lowered tapered valve 20 in engagement with the valve seat 24, however upon the upward movement of the brush carrying member 5, when an animal passes under the same, the valve stem 25 will be engaged by the bottom of the depression 27 of the member 5, thereby unseating the lower valve 22 and seating the upper valve 22 against the valve seat 23, which action will cut off the flow of oil from the pipe 17 into the chamber 29 of the valve casing 19, and will allow the oil within the chamber 29 to flow downwardly into the depression 27 of the arcuate member 5, from which it is distributed to the brushes 6 or backs of animals by overflowing into channels 30 in the upper side of the arcuate member 5, which channels are provided with perforations 31. After the animal passes under the device, the springs 13 force the arcuate member 5 downwardly and the spring 28 reseats the valve 22 in the valve seat 24, thereby allowing the chamber 27 to be again filled with oil.

From the above it will be seen that an animal scratching device is provided, which is simple in construction, positive in operation and provided with means whereby, as an animal passes under the device, oil will be discharged on its back. It will also be seen that the discharge of oil is intermittent in predetermined quantities, consequently waste of oil is obviated.

The invention having been set forth what is claimed as new and useful is:—

1. The combination with an animal scratching device comprising a frame, a vertically movable brush carrying member arcuately shaped and slidable in the frame, spring means for normally forcing said brush carrying member downwardly, of an oil supply tank above the brush carrying member, a valve carried by said tank, of a valve stem extending downwardly from said valve into a recess in the upper side of the brush carrying member and into which oil is discharged to oil grooves in the upper side of the brush carrying member, the bottoms of said oil carrying grooves being perforated.

2. The combination with an animal scratching device comprising a frame, an arcuately shaped brush carrying member vertically slidable in the frame, a horizontally disposed guide bar slidably mounted in the frame and connected to the brush carrying member, springs secured to the upper side of the bar and having spring arms for normally forcing the brush carrying member downwardly and an aperture in the bar in registration with a recess in the upper side of the brush carrying member, the upper side of the brush carrying member being provided with grooves in communication with opposite sides of the oil recess therein and having perforations in their bottoms, an oil tank, a valve controlling the flow of oil from the tank, a valve stem carried by said valve and extending through the registering apertures and into the oil chamber, said brush carrying member cooperating with the stem of the valve for intermittently discharging oil into the chamber and grooves of the brush carrying member.

In testimony whereof I hereunto affix my signature.

EMIL PFLAUM.